(12) United States Patent
Rhelimi

(10) Patent No.: US 10,298,394 B2
(45) Date of Patent: May 21, 2019

(54) METHOD TO AUTHENTICATE TWO DEVICES TO ESTABLISH A SECURE CHANNEL

(71) Applicant: GEMALTO SA, Meudon (FR)

(72) Inventor: Alain Rhelimi, Gemenos (FR)

(73) Assignee: GEMALTO SA, Meudon (FR)

( * ) Notice: Subject to any disclaimer, the term of this patent is extended or adjusted under 35 U.S.C. 154(b) by 170 days.

(21) Appl. No.: 15/121,910

(22) PCT Filed: Feb. 20, 2015

(86) PCT No.: PCT/EP2015/053617
§ 371 (c)(1),
(2) Date: Aug. 26, 2016

(87) PCT Pub. No.: WO2015/128257
PCT Pub. Date: Sep. 3, 2015

(65) Prior Publication Data
US 2017/0019256 A1    Jan. 19, 2017

(30) Foreign Application Priority Data
Feb. 28, 2014 (EP) .................. 14305294

(51) Int. Cl.
*H04L 9/32* (2006.01)
*H04L 9/08* (2006.01)
*H04L 29/06* (2006.01)

(52) U.S. Cl.
CPC ........ *H04L 9/3213* (2013.01); *H04L 9/0833* (2013.01); *H04L 9/0838* (2013.01);
(Continued)

(58) Field of Classification Search
CPC .............. H04L 63/065; H04L 63/0428; H04L 63/0846; H04L 9/0833; H04L 9/0838; H04L 9/3213
See application file for complete search history.

(56) References Cited

U.S. PATENT DOCUMENTS 6,240,188 B1 *  5/2001  Dondeti ............... H04L 9/0891
                                                    380/259
7,240,202 B1 *  7/2007  Orman ................. H04L 9/0833
                                                    380/255

(Continued)

OTHER PUBLICATIONS

Rafaeli, Sandro, and David Hutchison. "A survey of key management for secure group communication." ACM Computing Surveys (CSUR) 35.3 (2003): 309-329. (Year: 2003).*

(Continued)

*Primary Examiner* — Kari L Schmidt
(74) *Attorney, Agent, or Firm* — Buchanan Ingersoll & Rooney PC

(57) ABSTRACT

The present invention relates to a method to authenticate two devices to establish a secure channel, one belonging to a first group of devices, the second belonging to a second group of devices, in a non-traceable manner without the need to share a secret, each group being authenticated by an authority that stores a group secret key into the devices under its authority. The method uses a set of authentication tokens, one for each of the other groups with which the device is intended to communicate, said authentication token comprising at least a random number and a cipher of at least this random number by the secret key of each of these other groups, said authentication tokens being further renewed at each communication with a device from another group.

18 Claims, 1 Drawing Sheet

(52) U.S. Cl.
CPC ........ *H04L 63/0428* (2013.01); *H04L 63/065* (2013.01); *H04L 63/0838* (2013.01); *H04L 63/0846* (2013.01); *H04L 2209/24* (2013.01)

(56) References Cited

U.S. PATENT DOCUMENTS

| | | | | |
|---|---|---|---|---|
| 7,395,423 | B1* | 7/2008 | Dondeti | H04L 9/0833 713/151 |
| 7,840,805 | B2* | 11/2010 | Maillard | H04N 5/913 380/279 |
| 8,316,237 | B1* | 11/2012 | Felsher | H04L 9/0825 380/282 |
| 2004/0083363 | A1* | 4/2004 | Hengeveld | H04L 9/0833 713/163 |
| 2004/0098622 | A1* | 5/2004 | O'Neill | H04L 29/06 713/151 |
| 2005/0044356 | A1* | 2/2005 | Srivastava | H04L 9/0827 713/163 |
| 2005/0100166 | A1* | 5/2005 | Smetters | H04L 9/0492 380/277 |
| 2008/0226065 | A1 | 9/2008 | Zunke | |
| 2009/0154711 | A1* | 6/2009 | Jho | H04L 9/083 380/286 |
| 2009/0187982 | A1* | 7/2009 | Balfanz | H04L 63/065 726/9 |
| 2010/0153727 | A1* | 6/2010 | Reznik | H04L 9/0822 713/171 |
| 2010/0220856 | A1* | 9/2010 | Kruys | H04L 9/0833 380/44 |
| 2011/0305333 | A1* | 12/2011 | Jacobson | H04L 9/0844 380/44 |
| 2014/0164768 | A1* | 6/2014 | Kruglick | H04L 63/062 713/168 |
| 2014/0304505 | A1* | 10/2014 | Dawson | G06F 21/6227 713/165 |
| 2015/0280910 | A1* | 10/2015 | Crawford | H04L 63/06 713/171 |

OTHER PUBLICATIONS

Y. Kim, A. Perrig and G. Tsudik, "Group key agreement efficient in communication," in IEEE Transactions on Computers, vol. 53, No. 7, pp. 905-921, Jul. 2004. (Year: 2004).*
International Search Report (PCT/ISA/210) dated May 13, 2015, by the European Patent Office as the International Searching Authority for International Application No. PCT/EP2015/053617.
Written Opinion (PCT/ISA/237) issued on May 13, 2015, by the European Patent Office as the International Searching Authority for International Application No. PCT/EP2015/053617.
Bresson et al., "Provably Authenticated Group Diffie-Hellman Key Exchange—The Dynamic Case", Lecture Notes in Computer Science/Computational Science, vol. 2248, Jan. 1, 2001, pp. 290-309.

* cited by examiner

METHOD TO AUTHENTICATE TWO DEVICES TO ESTABLISH A SECURE CHANNEL

FIELD OF THE INVENTION

The present invention relates to a method to authenticate two devices to establish a secure channel. More specifically, the invention concerns the context where one device belongs to a first group of devices and the second device belongs to a second group of devices, each group being authenticated by an authority that stores a group secret key into the devices under its authority. Even more specifically, the invention is interested in providing this authentication in a non-traceable manner without necessitating to share secret.

The invention also pertains to a device implementing said method.

BACKGROUND OF THE INVENTION

It is known for two devices to share a secret key. By performing a bidirectional authentication, the two devices can authenticate. This solution is efficient but requires a share of the same secret key among the concerned devices. This secret key becomes a "master" key. Breaking a single device is thus sufficient to break a whole system as soon as the secret key is shared by a group of devices.

For such situation where devices rely to a group of devices, each group may publish a public key. Each device may store the private key of the group. The two devices may perform a bidirectional authentication by using the group public key of the remote device. This solution is efficient but it also requires to share the same secret key between all devices. This secret key becomes a "master" key and by breaking a single device then, again, the whole system is broken. The above solution presents the advantage to avoid any traceability of each individual device.

Another solution could be, for each device, to host a private key and a certificate of its public key. By exchanging the two certificates then the two devices may perform a bidirectional authentication. Here the key system is diversified. Breaking a device is no more sufficient to break a whole group. However, here, certificate is unique per device. The certificate acts as constant allowing a correlation and a traceability of each device.

Further alternative and advantageous solutions would, accordingly, be desirable in the art.

SUMMARY OF THE INVENTION

The present invention aims at providing a fast authentication method between two devices while guaranteeing non traceability and without having to share secret between the two devices.

The present invention is defined, in its broadest sense, as a method comprising the preliminary step of providing each device from each group with a set of authentication tokens, one for each of the other groups with which the device is intended to communicate, said authentication token comprising at least a random number and a cipher of at least this random number by the secret key of each of these other groups;

said method further comprising the steps of, when two devices from different groups initiate a communication, for each of the both devices, sending a group identifier to the other device,
receiving a group identifier from the other device,
selecting the authentication token stored for the other group, preparing and sending to the other device the corresponding cipher to the other device,
receiving a cipher from the other device,
decrypting the received cipher using the stored group secret key to get the random number,
deducing a session key from the random number,
establishing a secure channel using said session key,
generating a new authentication token for its own group from a new random number using group secret key,
sending the new authentication token to the other device over the established secure channel,
receiving, from the other device over the established secure channel, a new authentication token for the group of this other device.

With the invention, there is no correlation possible between subsequent authentications enforcing the non traceability. Indeed, there is no exchange of constants between subsequent authentications as authentication tokens are always changing as soon as a communication took place. With the invention, authentication tokens are renewed at each communication with a device from another group.

The invention also avoids any use of shared keys between both devices. However, the invention ensures the confidentiality of the peer to peer data exchange if no observer knows the two group keys of the two devices involves in the data exchange.

The invention also takes benefits of faster symmetric encryption algorithms (e.g. AES, 3DES) against asymmetric encryption algorithms (e.g. RSA, ECC).

With the invention, a renewal of authentication token is realized at each communication establishment insuring a great diversification of the authentication tokens.

The invention enables the two devices to exchange data confidentially while guaranteeing non traceability of the two devices, while not sharing secret. The invention thus proposes a simple way to improve non traceability for a fragmented market controlled by multiple secure element makers, typically defining the groups, without complex PKI or key management system.

Another advantage of the invention is to enable to revoke a group of devices by deleting the authentication tokens of this group, this deletion being possibly realized without network connection of any device.

According to an advantageous embodiment, said cipher includes a time-stamping data.

Such a time-stamping data is typically inserted when the authentication token is created using the group secret key.

Advantageously, said time-stamping data is used to limit the validity of the authentication token in time.

The time-stamp is thus advantageously a validity date added to the random number before encryption with the group secret key. Each device is advantageously able to calculate time-stamps to include in any new authentication token generated to be sent to the other device in communication according to the method of the invention. Moreover such time-stamp can be used to check the validity of the data.

According to an advantageous embodiment, said cipher includes a counter data, said counter being incremented or decremented at each authentication in the aim to limit the number of authentication.

This embodiment enables the authority of a given group to control the number of authentications according to a policy defined by the group authority.

According to an advantageous feature of the invention, the set of groups comprising devices having authentication tokens of other groups being named a circle of confidence, authentication tokens as provided by the authority of a given group to devices of another group or as provided by devices from this given group to devices of other groups includes, in the cipher, data to propagate to devices of at least one of the group of the circle of confidence.

This feature exploits the circulation of diversified authentication tokens according to the invention.

In a particular implementation, data to be propagated target the devices of the given group.

This implementation enables a viral update of the devices of the given group as soon as a dedicated authentication token has been pushed in at least one device of another group. In the cipher of the dedicated authentication token, data to be propagated include a corresponding command targeting the device that will decrypt the cipher.

For example, an authority managing a first group of devices may ask devices of its group to delete authentication tokens related to a second group of devices through a command sent in an authentication token as provided/pushed to devices of other groups when they are connected to the network, and preferably to the devices of the second group.

Then, during authentication, the revocation of the devices of the second revoked group becomes viral for each connection of a device of the first group to a device of the second group. The method can be qualified as viral revocation.

Devices of the given group are further such that this command, diversified or not, is always inserted in any of the new given group's authentication tokens. It ensures the propagation of the update or of any other kind of actions to be applied to devices of the given group or to be done by these devices. The insertion of a corresponding command in a cipher can be sufficient to propagate the command to all the devices.

Thus the other groups of devices can be used as a network for conveying data targeting a given group without dedicated network connections.

In another particular implementation, data to be propagated target devices of another given group forwarded by the device of the first group to the device of the other given group once a secure channel is established with the device of this other given group.

This implementation enables a viral update of the devices of another given group as soon as a dedicated authentication token of the given group has been pushed in at least one device of another group. Such a dedicated authentication token has a corresponding command included in data to be propagated in the cipher.

This command is not interpretable or is not intended to affect the devices of the given group that will decrypt the cipher in which it is included. Advantageously the command is encrypted in order to avoid the devices of the given group to have access to the content. Thus, devices of the given group, once the cipher has been decrypted, are such that the command is forwarded in the established secure channel to the device of the other group as soon as it is in secured communication with.

According to a particular feature, said method comprises the sub-step, for devices of the given group, of inserting data to propagate in any of the new given group's authentication tokens.

With this particular feature, to ensure the propagation, devices of the given group are further such that this command is always inserted in any of the new given group's authentication tokens. It ensures the propagation of the update or of any other actions to be applied to devices of the other given group.

The device of a given group of a circle of confidence can thus propagate data (e.g. commands . . . ) to devices of any one of the groups by using the renewal of the authentication tokens and the establishment of the secure channel.

For example, the authority of a given group can ask the devices of its group to include, in the cipher of the renewal authentication token, a command requesting the deletion of the first group's authentication tokens in the devices of the second group. Preferably the command is diversified and hidden by each of the device of the first group.

Here also, during authentication, the revocation of the devices of the second revoked group becomes viral for each connection of a device of the first group to a device of the second group. The method can also be qualified as viral revocation.

According to a specific embodiment, sub-groups being defined in at least one of the first and second groups, each sub-group being authenticated by a sub-authority that stores a sub-group secret key into the devices under its authority, authentication sub-tokens are provided to the devices of the other groups and sub-groups to enable the method to be iterated with sub-groups.

The invention ensures a nested non traceability between groups and sub-groups as soon as the iterative authentications start from the biggest groups to the smallest ones.

Such sub-groups enable to exploit the non-traceability advantage of the invention while providing the possibility to authenticate more precisely to a specific sub-group.

Such sub-groups are typically defined as specific containers of the devices, typically one type of Trusted Service Manager (TSM) defines one sub-group among one of the group. Typically several TSM associated to service providers can be implemented in secure elements. Sub-groups will be formed by these TSM. A given specific application can also define a sub-group.

With sub-groups, the confidentiality of the peer to peer data exchange is even strongly reinforced as it would be necessary to know all key and sub-keys to access exchanged data. In a fragmented market, in order to observe data in a given secure channel, it is necessary to know all the keys which is unlikely.

The number of elements in a sub-group can be as much as in the group. Indeed, if each device of a group has a specific kind of TSM, there will be as many elements in the sub-group formed by the TSM as in the previous group level.

In the case where the number of elements of a sub-group is less than the number of device in the group above, there is a reduction of the non-traceability properties.

According to an advantageous implementation, an encrypted communication channel being previously established using the method of the invention, the method is iterated with sub-groups while using this communication channel to send/receive sub-ciphers.

This implementation uses the secure channel established using the superior group to reduce risk of traceability in the case the number of elements in the sub-group is smaller than in the previous group level.

The present invention also concerns device belonging to a first group of devices intended to authenticate with any second device belonging to at least a second group of devices, in a non-traceable manner without necessitating to share secret, each group being authenticated by an authority that stores a group secret key into the devices under its authority, said device being provided with a set of authentication tokens, one for each of the other groups with which the device is intended to communicate, said authentication token comprising at least a random number and a cipher of at least this random number by the secret key of each of these other groups;

said device further comprising:

a module to select, when it initiates a communication with a device from another group, the authentication token of another group and to prepare the corresponding cipher Cx to be sent to the other device, communication means to send/receive group identifier and ciphers to and from the other device, a cryptographic module to decrypt the cipher received from the other device using the stored group secret key, a calculation module to deduce a session key from the deciphered random number and the random number of the other group corresponding to the cipher sent to the other device and to generate a new authentication token from a new random number for its own group, said new authentication token being intended to be sent to the other device over an encrypted communication channel using the session key.

Such a device implementing the method of the invention is able to authenticate with any device from another group without requiring the sharing of a secret key and while guaranteeing non traceability of its activity. The calculation module can also be used to check the integrity of the data, for example by using time-stamp.

Therefore, with such device, confidentiality of a peer to peer communication is enabled against an observer until this last one does not know all keys of groups and sub-groups.

As they are protected by one of the key of the groups, exchanged ciphers can contain random number and data as commands, the transfer of which is secured.

According to a particular feature, the set of groups comprising devices having authentication tokens of other groups being named a circle of confidence, said device is such that it includes data to be propagated to devices of at least one of the group of the circle of confidence in any of the new authentication tokens of its group.

With this feature, viral propagation of commands can be provided to devices of the group of such a device or to devices of any of the other groups of the circle of confidence.

According to an advantageous embodiment, said device belonging to a sub-group of one group, it is further provided with a set of authentication sub-tokens belonging to other sub-groups with which the device is intended to communicate, each sub-group being authenticated by a sub-authority that stores a sub-group secret key into the devices under its authority.

While implementing such a structure of sub-groups, generally associated to containers inside the device, the device is able to provide specific authentication to these containers. Such a possibility could be decisive for some type of containers.

BRIEF DESCRIPTION OF THE DRAWINGS

The following description and the annexed drawings set forth in detail certain illustrative aspects and are indicative of but a few of the various ways in which the principles of the invention may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1:
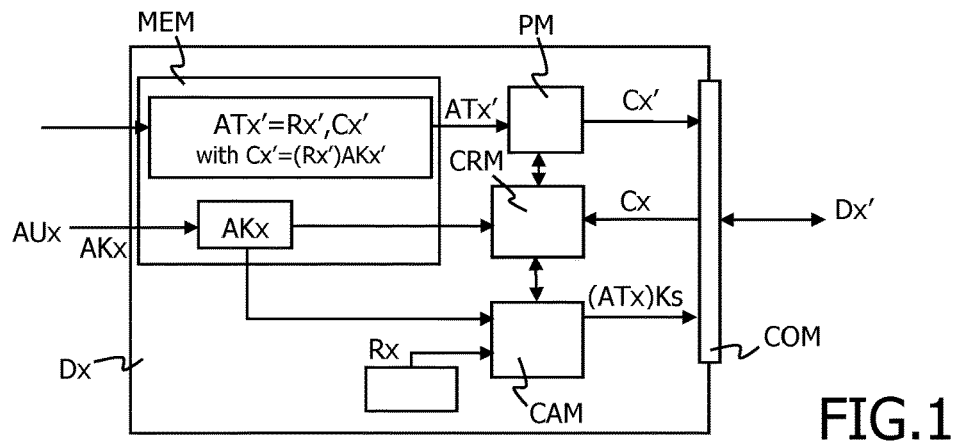
FIG. 1 schematically represents a device of the invention.

The same elements have been designated with the same reference numerals in the different drawings. For clarity, only those elements and steps which are useful to the understanding of the present invention have been shown in the drawings and will be described.

FIG. 1 shows a device Dx of the invention belonging to one group Gx. This device is advantageously a secure element. Groups are typically constituted by a set of such devices produced by a given firm under a given reference. Such groups of devices are observed in fragmented markets where they are controlled by multiple and different device makers. It is precisely the case in the market of secure elements.

Each group Gx (in the below specification x=1 or 2) is controlled by its authority AUx. These authorities previously stored its secret key AKx in memory MEM of each device Dx of the group Gx under its authority. This secret key AKx is private to the group and unknown from the other groups.

For the implementation of the invention, the device Dx also preliminary received and stored, in memory MEM, a set of group authentication tokens ATx'. There is one authentication token for each group Gx', x'≠x, with which the device Dx is intended to communicate and with which there exist a confidence prerequisite defining a circle of confidence.

The device Dx thus collected a set of authentication tokens ATx' for each group Gx' of the circle of confidence its group Gx belongs to. Consequently, each device Dx hosts a set of N−1 group authentication tokens ATx' In memory MEM. There is one authentication token ATx' for each of the other N−1 groups Gx' of the circle of confidence including N groups.

The collection of authentication tokens per group shall be huge enough for guaranteeing a pseudo diversification and the non traceability at least for the upper level groups. The number of authentication tokens for one group corresponding to the number of devices in other groups, it means that the number of devices in others groups has to be high. The number of devices in each group has thus also to be high.

Each group authentication token ATx' is a couple of two elements as follow: a generated random number Rx', and a cipher Cx' of at least this random number Rx' using the secret key AKx'.

It is here noted that the generated random number Rx' can be structured as a collection of data as a time-stamp, commands and a usual random number. Some of these data can be further enciphered. In another equivalent implementation, the random number Rx' is an usual random number and data, for example time-stamp and commands, are adjoined to the random number Rx' for the calculation of the cipher Cx' using the key AKx'. The man skilled in the art will of course recognize that both of these realizations are equivalent for the implementation of the invention.

Of course, following the previous comment, each device of a given group is aware of the format of the data inside the cipher in order to be able to identify, in the decrypted data, the random number which is also provided in the authentication token inside the decrypted data and which has to be used for the calculation of the session key.

The device Dx further comprises a module PM to select the authentication token ATx' of the other group to which belongs a device with which a communication is initiated. This module PM also prepares the corresponding cipher Cx' as stored in the authentication token ATx' to be sent to the other device.

The device also comprises communication means COM to send/receive group identifiers when a communication is initiated between two devices and to send/receive ciphers to and from other devices.

The device Dx also comprises a cryptography module CRM to decrypt the ciphers received from other devices using the stored group secret key AKx. The cryptography module thus outputs the decrypted random number Rx that was encrypted in Cx for further use. The cryptography module CRM is advantageously mutualized for group and sub-group in a given device.

The device Dx also includes a calculation module CAM to deduce a session key Ks from the decrypted random number Rx and the random number Rx' of the other group as stored in the selected ATx'.

This calculation module CAM, in collaboration with the cryptography module CRM, also generate a new authentication token ATx from a new random number Rx for its own group Gx.

It has here to be understood that the definition of the different module is illustrative and dedicated software part to implement the different actions could be implemented equally in a different way without departing from the scope of the invention.

Figure 2:
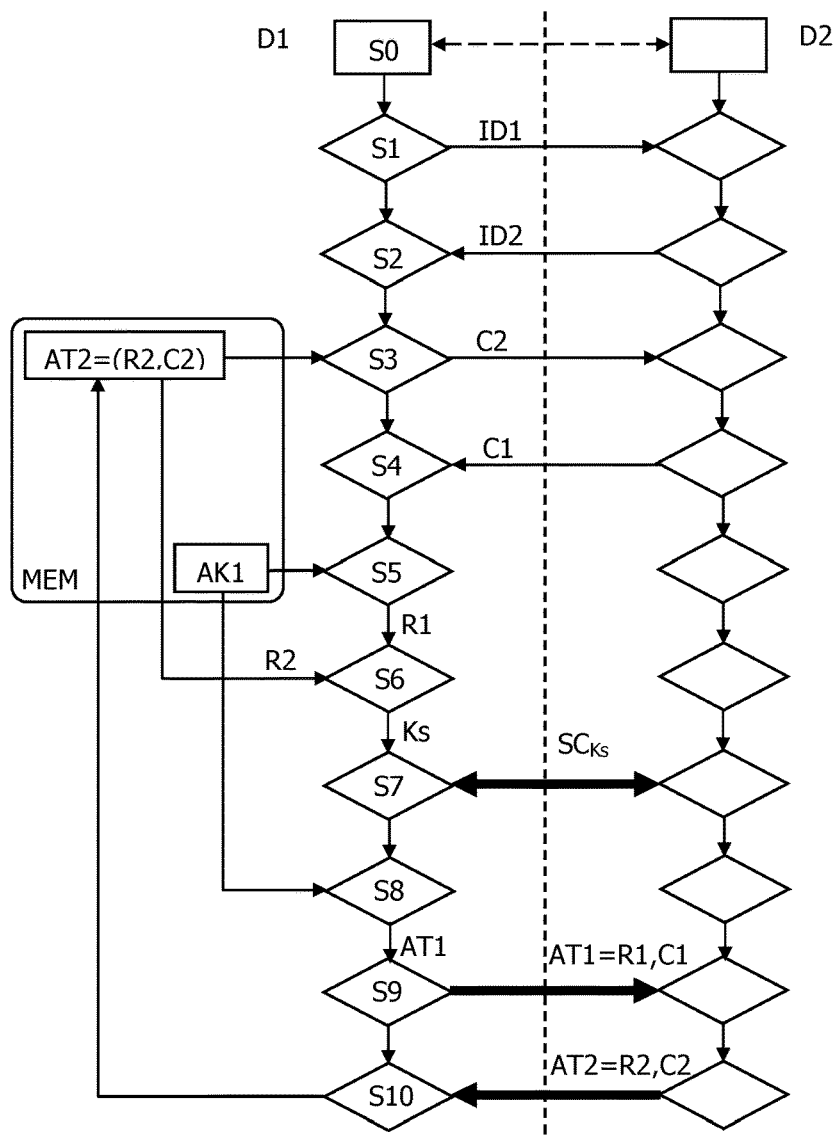
FIG. 2 illustrates the method of the invention applied on the authentication of two devices belonging to two different groups.

FIG. 2 is a flow chart of the authentication method of the invention as implemented in a device D from one group G and willing to authenticate with another device D2 from another group G2 of devices. The encryption is based on symmetrical algorithm using a group secret AK1 stored in all devices of the group G1.

The two devices are represented on the FIG. 1 but the method is described only from the device D1 point-of-view, the method being symmetric in the other device D2.

First of all, devices D1 and D2 enter in contact with each other in a first step S0. Then the method of authentication of the invention includes a step S1 of sending an identifier ID1 of the group G1 to device D2 and a step S2 of receiving an identifier ID2 of the group G2 to which the device D2 belongs to.

The stored group authentication token AT2 related to the group G2 of the identifier ID2 is then selected in device D1 and, in a step S3, D1 prepares and sends a challenge including the cipher C2 as found in the authentication AT2 to the second device D2. It is here noted that the challenge is advantageously reduced to the cipher itself alone. Nevertheless, the method of the invention does not exclude other data to circulate with this cipher. In particular the challenge can include a time-stamp.

However, advantageously and according to the invention, this time-stamp is included in data to be ciphered to generate the cipher Cx. The time-stamp is advantageously a date giving the end of validity of the token.

In a step S4, it receives from the second device D2 a challenge including a cipher C1 as extracted from the authentication token AT1 stored in D2 for the group G1.

In a step S5, the cipher C1 is decrypted and a random number R1 is extracted. In the case a time stamp is included in the ciphered data, decrypted data will include at least the time-stamp and the random number.

In a step S6, a session key Ks is calculated using the random number R2 as extracted from the authentication token AT2 as stored in D1 the decrypted random number R1. A secure channel SC, being represented as a bold arrow on FIG. 2, is established between devices D1 and D2 using session key Ks in a step S7. It constitutes a virtual private channel.

Then, said method includes a step S8 of generating a new authentication token AT1 using the group secret key AK1.

Optionally, the newly generated authentication token ATx is constituted of the session key Ks as random number Rx and of its cipher Cx. In this case, the both device share the same random numbers and the authentication are diversified by pair. This option guarantees that no device will compute a constant challenge which may weak a group regarding to the non-traceability property.

In a step S9, the new authentication token AT1 is sent to the other device D2 with which the device D1 is currently in communication through the secure channel $SC_{KS}$ established with session key Ks. This secure channel $SC_{KS}$ is thus used to transfer a new authentication token for group G1.

This new authentication token will be stored in the device D2. The authentication tokens AT1 of the group G1 are thus fully diversified on the different devices of the other groups Gx'. It is obviously the same for the authentication tokens of other groups.

The secure channel can also be used to transfer any command or information, ciphered or not, dedicated to the device D2 of the second group.

In a step S10, the device D1 receives an authentication token AT2 for the group G2 from the device D2. This new authentication token AT2 is stored in memory MEM where it replaces the previously stored one that is destroyed. The new authentication token AT2 as stored will serve for next use in a communication of device D1 with any one of the device from group G2.

The following table summarizes the protocol of the invention based on an AES algorithm.

| Step | D1 | Operation | D2 |
|---|---|---|---|
| P0 | AK1 | | AK 2 |
| P1 | AT2 = [R2; C2 = AES AK 2 (R2)] | AT1 →<br>← AT2 | AT1 = [R1; C1 = AES AK1(R1)] |
| S1, S2 | ID1 = 1 | ID1 →<br>← ID2 | ID2 = 2 |
| | Challenge = C2 | | Challenge = C1 |
| S3, S4 | | C2 →<br>← C1 | |
| S5 | R1 = AES$_{-1}$ AK1 (C1) | | R2 = AES$_{-1}$ AK 2 (C2) |
| S6 | K$_s$ = R1&R2 | | K$_s$ = R1&R2 |
| | | S7 - All exchanges encrypted by K$_s$ | |
| S8 | R1 = random( )<br>C1 = AES AK1 (R1) | ID1, C1 →<br>← ID2, C2 | R2 = random( )<br>C2 = AES AK 2 (R2) |

-continued

| Step | D1 | Operation | D2 |
|------|----|-----------|----|
| S8' | $C1 = AES\ AK1(K_s)$ | ID1, C1 → ← ID2, C2 | $C2 = AES\ AK\ 2\ (K_s)$ |
| S9, S10 | If ID2 = 2 then AT2 = [R2, C2] | | If ID1 = 1 then AT2 = [R1, C1] |

In the above table, step P0 and P1 corresponds respectively to the storage of the group secret key AKx in each device and the storage of the authentication tokens ATx' of the other groups. The step S8' corresponds to the option where the authentication tokens are calculated from the session key Ks as disclosed above.

The invention enables the verification of the authenticity of the other device. Indeed if ever both devices do not share the same session key then the authentication token AT2 of the group G2 of the other device is not destroyed.

A previous token of a given group is destroyed only if the connection with a device of the group is successful. Besides, in order to always keep at least one valid authentication token, at least one backup authentication token is advantageously kept. It is also useful if ever a fake token is sent. It is thus useful to store the current token and an earlier one.

In this case, tokens are advantageously not time-limited. Advantageous embodiment could be to keep one token among N while it renders more complex replay attacks.

The invention also enables to implement recovery procedure. It can include the possibility to retrieve by a device of a first group an authentication token for a second group through a communication with a device of a third group. Such a retrieval is realized using secure channel established between first and third groups' devices. This retrieval exploits the possibility to insert a command to be propagated in the cipher of an authentication token and to use the invention for implementing a viral process.

The cipher provided to and stored by the device of the third group has to include an authentication token for the first group including the second group authentication token. In this case the retrieval is automatic. Such procedures are useful to retrieve tokens offline.

To increase security, the mutual authentication can be checked by resending the random numbers R1 and R2 encrypted with the session key Ks.

According to the invention, only an encryption and a decryption using AKx has to be performed on each device to authenticate. No persistent secrets are shared between devices of different groups and it allows independent management of such devices.

According to particular embodiment of the invention, sub-groups on two or more levels are also defined using sub-tokens. In this case, tokens are exchanged using the secure channel established with the authentication tokens' exchange of the previous level. It is the difference with the previous groups' level. For other aspects, the implementation of the method of the invention on the level of the sub-groups is the same than the one described above on the level of groups.

Such a tunneling can be implemented on two or more levels, potentially reducing the number of diversified sub-tokens at each level because of the reduction of the number of devices in the sub-groups. The traceability is thus increased but the communication is already secured by the secure channel established on the previous level. Even the numbers of the concerned sub-groups circulating inside the secure channel, the level of security remains correct. Only the first group number is thus transferred without protection according to the invention.

Advantageously, when the invention is applied to secure elements' manufacturers as largest groups, the structure of sub-groups and their levels is advantageously constructed following the secure element structure. This includes typically containers and sub-containers: TSM, Service Provider TSM, for example including GP 2.2.2 application.

A sub-group can be associated to each kind of these sub-containers. In this case, a sub-group secret key is stored in the sub-container. Intermediate and hierarchical authorities are here required. The authority of a higher group is advantageously authorized to exclude a sub-group. Advantageously cryptography means of the device are mutualized for the device, its containers and sub-containers.

Sub-group can also be identified using Universal Unique Identifier (UUID). Applications using a same UUID can thus define a sub-group.

Such sub-groups definition enables to reach an optimized compromise in terms of security, non-traceability and authentication duration.

The invention proposes a kind of one to one bootstrapping between mates.

For connecting a new group Gx" of devices into the circle of confidence of the groups, a set of authentication ATx" computed by the authority of the new group AUx" shall be registered into the existing devices of the other groups.

For removing a group Gx of devices off the circle of confidence of the groups, the authentication token ATx of the group to remove shall be unregistered off the existing devices of the other groups. Viral revocation can be implemented thanks to the authentication token's circulation of the invention.

It is also possible to exclude any device inside a group by destruction of the other groups' tokens in its memory. It is also possible to exclude them by sending false authentication tokens rendering communication with any devices from other groups not possible. It is thus possible to revoke a group of devices offline, i.e. without connection to any network. The establishment of a communication with another device from another group is enough to revoke any device from a given group by a viral revocation.

To revoke a particular device, once authentication through the invention is realized, additional commands included in the exchanges between the two devices can enable to revoke a given device even if it never connects to the network. Said commands need to be associated with a device identifier. They are provided to devices of other groups in an authentication token of the group of the particular device to be revoked. These commands with device identifier have to be added or integrated to any random number used to create a new authentication token by any device of the group of the particular device.

It can be here noted that other actions than revocation can be commanded in a similar way.

If time-stamps are used, it is also possible to implement automatic revocation by giving a lifetime to authentication tokens. If the device has means to connect to network, a new authentication token can be then retrieved online by the device after a network authentication.

It is also possible to convey enciphered and confidential data in authentication token by using other groups without disclosing the said confidential data to the group devices ensuring the transport. Typically a public key will here be used to protect such data as there is no traceability because of the impossibility to observe.

For revalidating a device belonging to a revoked group, a new group secret key is advantageously registered by an authority in the device by using a diversified key of the device that allows targeting each device individually. Then authentication tokens from other groups are retrieved.

It has to be noted that the viral possibilities offered by the invention can be very useful. The circulation of authentication tokens among devices with the random character of the communications' establishments renders possible to propagate patch or any update among all the devices of one or several groups. It is implemented through the inclusion of the patch or of the update in the encrypted data to form the cipher Cx.

It is in particular possible to update sub-groups structure using this viral effect to make keys circulating in cipher themselves or in secure channels established according to the invention between devices. It avoids the devices to have to connect on the network, this viral effect being offline. Updates can also be transferred through secure channel while only the information of the availability of such an update has been included in authentication token.

In the above detailed description, reference is made to the accompanying drawings that show, by way of illustration, specific embodiments in which the invention may be practiced. These embodiments are described in sufficient detail to enable those skilled in the art to practice the invention and are not to be taken in a limiting sense. The scope of the present invention is defined only by the appended claims, appropriately interpreted, along with the full range of equivalents to which the claims are entitled.

The invention claimed is:

1. A method for authenticating two devices to establish a secure channel, one belonging to a first group of devices, the second belonging to a second group of devices, in a non-traceable manner without the need to share a secret, each group being authenticated by an authority that stores a group secret key into the devices of the group under its authority, said method comprising:

a preliminary step of providing each device from each group with a set of authentication tokens, one for each of the other groups with which the device is intended to communicate, each authentication token comprising at least a random number and a cipher of at least this random number by the secret key of each of these other groups, said cipher including a time-stamping data that is used to limit the validity of the authentication token in time;

said method further comprising the steps of, when two devices from different groups initiate a communication, for each of the two devices:

sending, by a communication interface of a first device of the two devices, a group identifier to the other device;

receiving, by the communication interface, a group identifier from the other device;

selecting, in a memory of the first device, the authentication token stored for the other group;

preparing and sending, by the communication interface, to the other device, the corresponding cipher to the other device;

receiving, by the communication interface, a cipher from the other device;

decrypting, by a cryptographic module of the first device, the received cipher using its own stored group secret key to get the random number;

deducing, by a calculation module of the first device, a session key from the random number;

establishing, on the communication interface, a secure channel using said session key;

generating, by the calculation module, a new authentication token for its own group from a new random number using the group secret key;

sending, by the communication interface, the new authentication token to the other device over the established secure channel;

receiving, by the communication interface, from the other device, over the established secure channel, a new authentication token for the group of this other device, wherein the new authentication token for the group of this other device is used in a next communication between the first device and any other device from the group of this other device.

2. The method to authenticate two devices according to claim 1, wherein said cipher includes a counter data, said counter being incremented or decremented at each authentication to limit the number of authentication.

3. The method to authenticate two devices according to claim 1, wherein, the set of groups comprising devices having authentication tokens of other groups being named a circle of confidence, authentication tokens as provided by the authority of a given group to devices of another group or as provided by devices of this given group to devices of other groups includes, in the cipher, data to propagate to devices of at least one of the group of the circle of confidence.

4. The method to authenticate two devices according to claim 3, wherein data to be propagated target the devices of the given group.

5. The method to authenticate two devices according to claim 3, wherein data to be propagated target devices of another given group forwarded by the device of the first group to the device of the other given group once a secure channel is established with the device of this other given group.

6. The method to authenticate two devices according to claim 3, said method comprising the sub-step, for devices of the given group, of inserting data to propagate in any of the newly generated given group authentication tokens.

7. The method to authenticate two devices according to claim 6, wherein, an encrypted communication channel being previously established, by sub-groups in at least one of the first and second groups, each sub-group being authenticated by a sub-authority that stores a sub-group secret key into the devices under its authority, and providing authentication sub-tokens to the devices of the other groups and sub-groups, and wherein the method is iterated with sub-groups while using this communication channel to send/receive sub-ciphers.

8. The method to authenticate two devices according to claim 1, wherein, sub-groups are defined in at least one of the first and second groups, each sub-group authenticated by a sub-authority that stores a sub-group secret key into the devices under its authority, and authentication sub-tokens are provided to the devices of the other groups and sub-groups to enable the method to be iterated with sub-groups.

9. A device belonging to a first group of devices intended to authenticate with any second device belonging to at least a second group of devices, in a non-traceable manner without the need to share a secret, each group being authenticated by an authority that stores a group secret key into the devices of the group under its authority, the device comprising:
- a memory including a set of provided authentication tokens, one for each of the other groups with which the device is intended to communicate, said authentication token comprising at least a random number and a cipher of at least this random number by the group secret key of each of these other groups, said cipher including a time-stamping data that is used to limit the validity of the authentication token in time;
- a module for selecting, in the memory, when it initiates a communication with a device from another group, the authentication token of the other group and for preparing the corresponding cipher to be sent to the other device;
- a communication interface for sending/receiving a group identifier and ciphers to and from the other device,
- a cryptographic module for decrypting the cipher received from the other device using its own stored group secret key; and
- a calculation module for deducing a session key from the deciphered random number and the random number of the other group corresponding to the cipher sent to the other device and for generating a new authentication token from a new random number for its own group, wherein said new authentication token is sent to the other device over an encrypted communication channel established on the communication interface using the session key,
- wherein the communication interface receives, from the other device, over the established secure channel, a new authentication token for the group of this other device, and
- wherein the new authentication token for the group of this other device is used in a next communication between the device and any other device from the group of this other device.

10. The device according to claim 9, wherein, the set of groups comprising devices having authentication tokens of other groups being named a circle of confidence, said device is such that it includes data to be propagated to devices of at least one of the group of the circle of confidence in any of the new authentication tokens of its group.

11. The device according to claim 9, wherein, said device belonging to a sub-group of one group, is further provided with a set of authentication sub-tokens belonging to other sub-groups with which the device is intended to communicate, each sub-group being authenticated by a sub-authority that stores a sub-group secret key into the devices under its authority.

12. The device according to claim 9, wherein said cipher includes counter data from a counter that is being incremented or decremented at each authentication to limit the number of authentications.

13. The device according to claim 9, wherein, the set of groups comprising devices having authentication tokens of other groups defines a circle of confidence, and wherein authentication tokens as provided by the authority of a given group to the device, or as provided by devices of this given group to the device, include, in the cipher, data to propagate to devices of at least one of the groups of the circle of confidence.

14. The device according to claim 13, wherein data to be propagated target the devices of the given group.

15. The device according to claim 13, wherein data to be propagated to target devices of another given group is forwarded by the device to the device of the other given group once a secure channel is established with a device of this other given group.

16. The device according to claim 13, said device being adapted to insert data to propagate in any of the newly generated given group authentication tokens.

17. The device according to claim 9, wherein the device belongs to at least one sub-group defined in the group it belongs to, each sub-group being authenticated by a sub-authority that stores a sub-group secret key into the devices under its authority, the device thus storing a sub-group secret key for any sub-group it belongs to and authentication sub-tokens from other sub-groups to enable the device to authenticate with devices belonging to said sub-groups.

18. The device according to claim 17, wherein, an encrypted communication channel being previously established between a sub-group of the device and another sub-group, each sub-group being authenticated by a sub-authority that stores a sub-group secret key into the devices under its authority, the device is adapted to use this communication channel to receive sub-ciphers from the devices of the other groups and sub-groups and to send sub-cipher of its own group and sub-groups.

* * * * *